June 23, 1925.
P. KREUTZBERGER
TAPS, DIES, AND THE LIKE
Filed Aug. 23, 1921
1,542,893
4 Sheets-Sheet 1
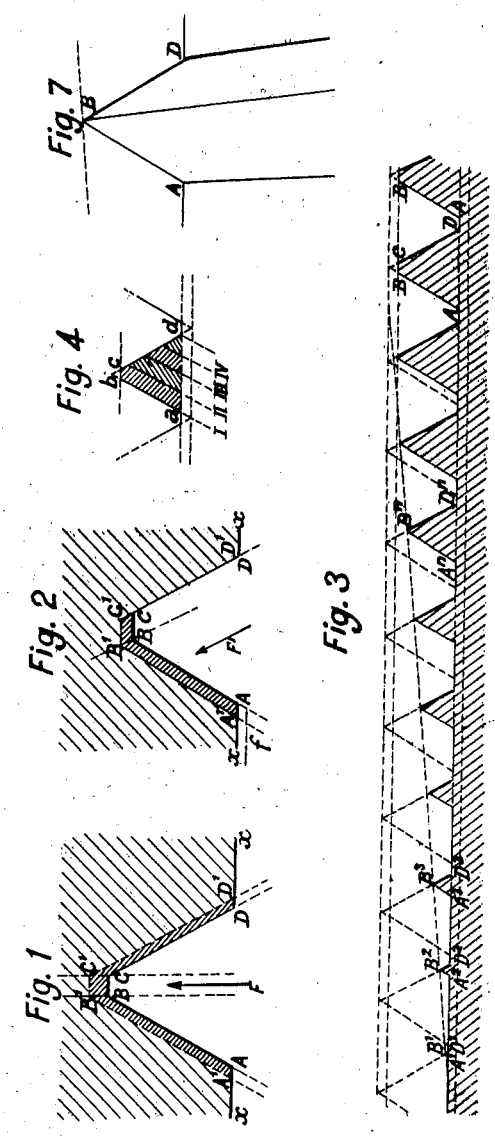
Inventor
P. Kreutzberger,
By Marks & Clerk
Attys.

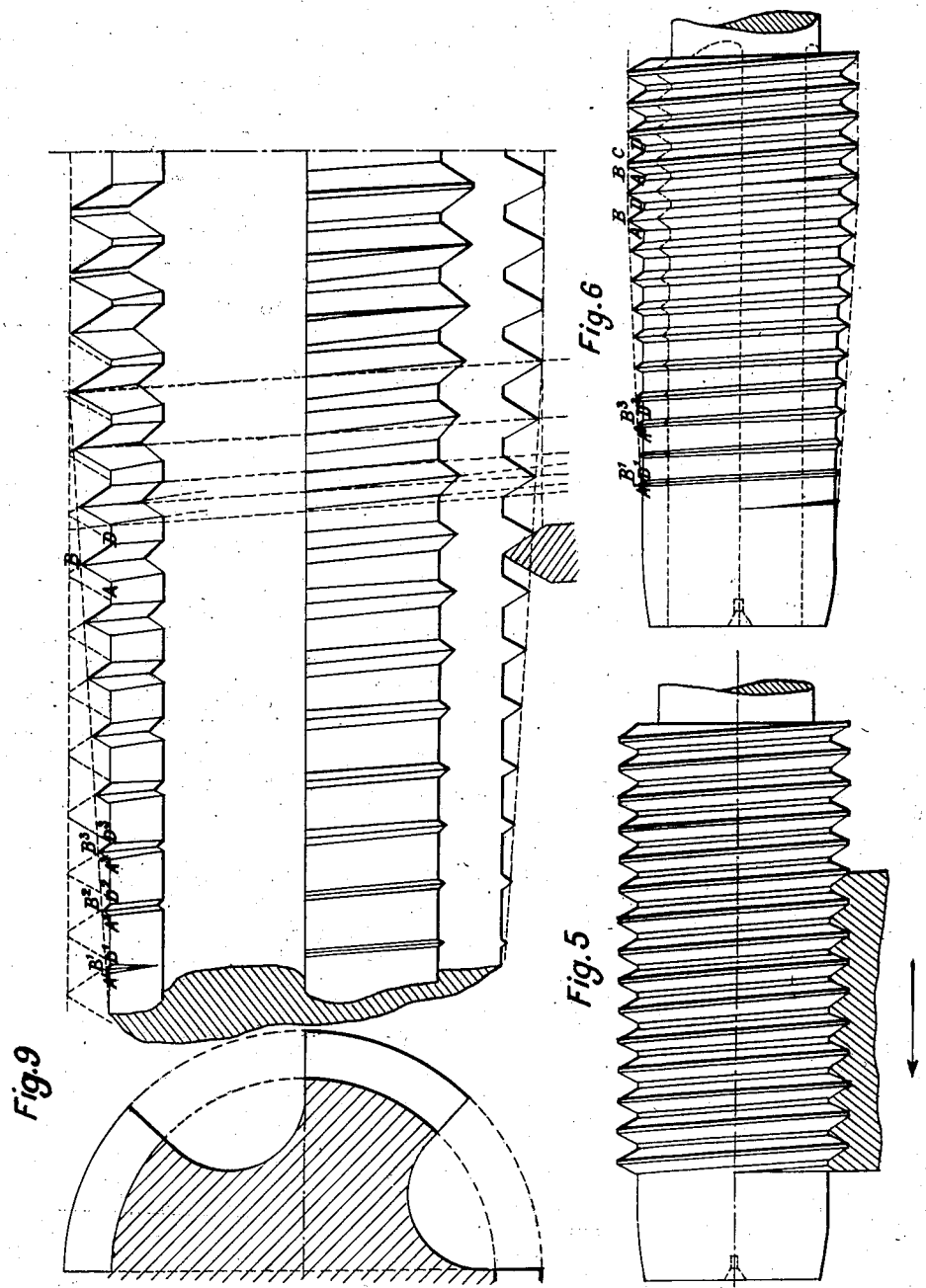

June 23, 1925.

P. KREUTZBERGER

TAPS, DIES, AND THE LIKE

Filed Aug. 23, 1921     4 Sheets-Sheet 3

Inventor
P. Kreutzberger,
By Marks & Clerk
Attys.

Patented June 23, 1925.

1,542,893

UNITED STATES PATENT OFFICE.

PAUL KREUTZBERGER, OF BELLEVUE, FRANCE.

TAPS, DIES, AND THE LIKE.

Application filed August 23, 1921. Serial No. 494,563.

*To all whom it may concern:*

Be it known that I, PAUL KREUTZBERGER, a citizen of the French Republic, and residing at 8 Rue des Buttes, Bellevue, Seine-et-Oise, France, have invented certain new and useful Improvements in and Relating to Taps, Dies, and the like, of which the following is a specification.

The present invention relates to improvements in tools used for forming triangularly shaped threads of screws or of nuts, either truncated or not, such as are used in taps and dies. The invention particularly relates to such tools in which the cutting of the metal is effected on one side only of the cutting teeth. The tools thus formed require less effort to bring them into action, they wear slower and may have a smaller length than those generally used because their mode of action is such as to allow all the elementary cutting edges to operate with the best clearance angles.

The present invention consists in an improved construction of screw cutting tools of the type in which the teeth only cut on one side, the improved construction being such as to facilitate manufacture.

The accompanying Figures 1 to 12 clearly illustrate how the improved tools, forming the subject of the present invention, are used and constructed in practice.

Fig. 1 illustrates the usual cutting action of an ordinary lathe tool,

Fig. 2 illustrates the cutting action of an ordinary lathe tool when arranged to cut on one side only, Fig. 3 diagrammatically illustrates a chasing tool in which the cutting action is analogous to that of the improved taps and dies, constituting the invention, Fig. 4 illustrates the cutting action of the teeth of the chasing tool shown in Fig. 3, Fig. 5 shows a tap in process of manufacture after the usual screw threading operation has been performed, Fig. 6 shows the tap illustrated in Fig. 5 after the thread has been tapered, Fig. 7 indicates the shape of a tooth of the tap, shown in Fig. 6 after the milling of the grooves to form the front cutting surfaces, Fig. 8 illustrates the backing-off of the teeth, Fig. 9 illustrates the completed tap to a larger scale, Fig. 10 indicates the original screw thread corresponding to the tap shown in Fig. 5, shown as developed on a plane surface, Fig. 11 indicates the screw thread shown in Fig. 10, firstly after the tapering of the thread, and secondly after the milling of the grooves to form the front cutting surfaces, Fig. 12 indicates the screw thread shown in Fig. 11, after the backing-off operation, Fig. 13 shows a modified form of tap in which the grooves forming the front cutting teeth are milled as slightly helical grooves.

In order that the operation of the tools may be clearly understood, it will now be explained how a single lathe tool may be operated so as to cut on one side only. This method of working in the case of an ordinary single tooth screw-cutting lathe tool is known.

Fig. 1 is a section of a form of screw thread which for instance may conform to the international standard system of screw-threads, with a truncated part B C, of definite size.

When an ordinary single tooth screw-cutting tool is used in a manner analogous to the operation of the taps and dies, which cut on one side of the teeth only, then instead of effecting an advance of the tool in the direction of the arrow F, that is perpendicularly to $x$—$x$ and therefore also perpendicularly to the axis of the screw formed, the advance is effected as shown in Figure 2, in the direction of the arrow $F^1$, that is in a direction parallel to the oblique face C D, which is on that side of its remaining metal screw thread corresponding to the direction $f$ of displacement of the tool, which displacement is supposed here to be taking place from right to left; this is the case when cutting a right-handed thread, if the object to be screw-threaded rotates in the direction usual in lathes, that is in the direction counter-clockwise for an observer situated at the fixed back-centre of the lathe and looking towards the rotating spindle of the main head stock.

From Figures 1 and 2, the difference between the two methods of cutting can be easily understood.

In the case of Figure 1, the part C D of the tool works with a negative cut as regards its front face as a scratcher works, whilst in the case of Figure 2, the inclination of the thread of the screw, has the effect of giving a natural cut to the part A B of the single tool.

Other differences not so important could be pointed out, and experience has shown that the cutting action illustrated in Figure 2 is much preferable to the cutting action shown in Figure 1.

The chasing tool illustrated in Fig. 3 comprises a combination of multiple tools whose cutting action is the same as that of the single tool above described.

In this chasing tool which is only diagrammatically illustrated, the elementary tools $A^1 B^1 D^1$, $A^2 B^2 D^2$, $A^3 B^3 D^3$, ABCD have sections of increasing dimension considered from the geometrical point of view, as shown on a larger scale in Fig. 4 by cutting the section of the complete screw-thread $a\ b\ c\ d$ by a series of lines I, II, III, IV, all of them parallel to $a\ b$. It is easily seen that if a chasing tool thus constructed is, as stated above, displaced from right to left, with the same speed relatively to the speed of rotation of the spindle of the lathe as that of an ordinary single tooth screw cutting tool, the various elementary tools or teeth of the chasing tool will cut shavings, the sections of which are shown by the spaces comprised between consecutive lines, such as I and II, II and III, III and IV; for instance, the elementary tool $A^3 B^3 D^3$ will deliver turnings the section of which is the portion comprised between the lines II and III of Figure 4. The sections of the various successive shavings are shown by hatchings alternately drawn in opposite directions, in order to be more clearly seen.

It is obvious that when the last teeth of the chasing tool, whose shape conforms exactly to the thread of the screw, such as ABCD reaches the piece to be screw-threaded, the latter will be acted upon in one cut only, such cut taking place under the best working conditions as diagrammatically illustrated in Fig. 2 and set forth above.

In workshop practice, means are known, operated either by hand or mechanically, for suitably shaping a tool, the section of which is polygonal, such as the section of the chasing tool which has just been described. It can, therefore already be considered that the description of the said tool is sufficient for permitting its construction.

In the case of a screw-tap or a die formed in a similar manner to the chasing tool above described and having for instance four substantially radial cutting faces, each of the latter will act like the chasing tool; the chasing tools will however be displaced, relatively to each other in the same manner as two consecutive teeth of one and the same chasing tool, so as to cause all the elementary tools which are available, to work equally. In this case, the manufacture of the tool is preferably effected by means of a process similar to that which will now be particularly described by way of example.

For greater simplicity in the figures, the case of a tap will be considered.

The round bar of tool steel from which the tap is to be made having been turned to a suitable diameter, it is necessary to screw-thread according to the ordinary methods, then before milling the grooves which form the cutting surfaces, to proceed with the following operation:—

Against the whole length of the tap is placed a suitable chasing tool having $n$ threads, $n$ being the number of threads that are intended to cut simultaneously, not counting the finishing threads, that is the threads of full section. The teeth of this chasing tool fit perfectly in the section of the screw-thread of the tap in its present form after screw threading, but before milling, as shown in Fig. 5. Then there is given to the chasing tool an advance movement from the right to the left (for a right-handed screw-thread and a normal direction of rotation of the lathe) with a speed or pitch $p^1$, where $$p^1 = \frac{n}{n+1}p,$$

$p$ being the pitch of the screw-tap to be made. It will be easily understood that the said chasing tool will leave behind it a screw-thread which decreases until it disappears entirely when the spindle of the lathe has made $n+1$ turns, thus forming the shape illustrated in Fig. 6. After this will be performed the process of milling the grooves forming the front cutting surfaces.

It should be pointed out here that according to the principle of this invention, only the left hand edge of each of the teeth $A^1 B^1$, $A^2 B^2$, A B should cut; at present, the said left hand edge cannot cut because the surface which is behind it would foul the surface of the thread just generated by the said edge, as the surface projects relatively to the said edge as shown in Fig. 7 by the edge A B and the surface behind it. It remains therefore, to proceed to an operation of backing off, giving the necessary clearance to the said surface behind the cutting edge.

The said operation is effected by a screw-threading cut in contradistinction to what is effected in the backing-off operation of ordinary taps and dies. With this object an ordinary screw-cutting tool is placed exactly against $A^1 B^1$ having its cutting edge inclined at 60° to the axis to correspond with the line A B and having its cutting surface directed downwards in contradistinction to the ordinary position. By rotating the lathe in the direction opposite to its ordinary direction of rotation, the said tool will cut the surfaces to be cleared. Alternatively the chasing tool illustrated in Fig. 3 may be substituted for the screw-cutting tool. If an advance or pitch is given to the tool which is greater than the pitch $p$ of the screw-thread for which the tap is constructed it will cut the above surface behind the cutting edge in such a manner that after manufacture, when the tap comes to be used, the edge $A^1 B^1$ will have the necessary back clearance and will be capable of cutting the metal without fouling (Figures 8 and 9).

However, if the said tool continues its motion under the same conditions, it would cut the edges $A^2 B^2$, $A^3 B^3$, in such a manner as to completely destroy the stepped arrangement of the successive teeth, which is itself a necessary feature of the present invention.

In order to cause the said tool, therefore, to carry out behind the edge $A^2 B^2$, the same operation as it has carried out behind $A^1 B^1$, it is necessary to impart to it a supplementary displacement in an opposite direction to the motion described above.

The amplitude of the said displacement is calculated as follows:—

As the pitch corresponding to the advance of the said tool is greater than $p$, it must be a fortiori greater than $p^1$ and may be expressed by $p^1 (1+x)$. The quantity $x$ depends on the clearance which is to be effected.

In the case of a screw-tap with four front cutting-surfaces, then in order to bring the tool against the face $A^2 B^2$, it will be necessary to impart to it a recoil equal to $\frac{p^1 x}{4}$.

The time chosen during which to effect the said recoil, will of course be chosen so that the tool is then opposite one of the grooves separating consecutive rows of teeth, at which time there is an empty space through which the tool can move.

The method of carrying out this process may vary according to the arrangements of the lathe. One such method will now be described for the sake of example.

First of all, the movement of pitch equal to $(1+x) p^1$ may be obtained by means of the main screw of the lathe, and the recoil may be effected by the screw of the small upper carriage of the lathe, it being understood that the slideway of the small carriage is maintained parallel to the geometrical axis of rotation of the lathe. With this method, it will be sufficient to mount a pawl to actuate the said screw of the small carriage, the said pawl acting in the suitable direction with a suitable amplitude four times per revolution at the time when the tool comes into the empty space formed by one of the four grooves of the tap.

The jerking movement thus produced is, as applied to the present backing off process, an important improvement. It is to be understood that this backing-off operation in the case of a large screw-tap may be effected in several cuts, in the last of which it moves exactly in the path hereinbefore described. The clearance thus obtained is correct for the first $n$ threads, the teeth of which operate in oblique graduated cuts, as above described. At its right hand end, the tap has, in addition, a number of finishing teeth, the section of which corresponds exactly to the screw-thread to be made.

It is possible to completely back off these finishing teeth by giving to the main carriage of the lathe a continuous speed corresponding to a pitch equal to $p (1+x)$ and not $p^1 (1+x)$, while the intermittent superimposed displacement or recoil is made of amplitude equal to $\frac{p.x}{4}$ instead of $\frac{p^1 x}{4}$. But, as a more simple operation, it is possible to continue for the said finishing screw-threads, the cut or cuts carried out on the first $n$ screw-threads. In this way, the said finishing teeth will be less and less cleared from the rear, but this has no serious drawback.

Various phases of manufacture of a screw-tap embodying the improvements of the present invention, are illustrated in Figures 10, 11 and 12 which show a portion of the screw-threaded developed into a straight bar, this development being supposed to take place in spite of the differences of radii outside and inside the said screw thread.

Figure 10:
Figure 10 shows the original screw-thread having its section of full size at all points, which corresponds to a stage common to the manufacture of all kinds of screw-taps.
Figure 11:
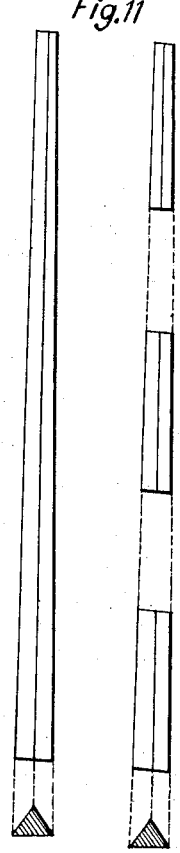
Figure 11 shows at its left hand side the screw-thread gradually thinned after the passage of the chasing tool, while the right hand side of this figure shows the same screw-thread interrupted by the milled grooves of the screw-tap.
Figure 12:
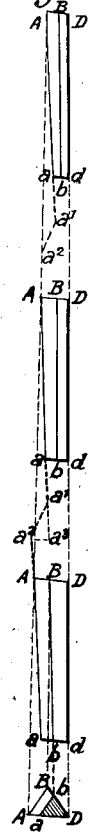
Figure 8:
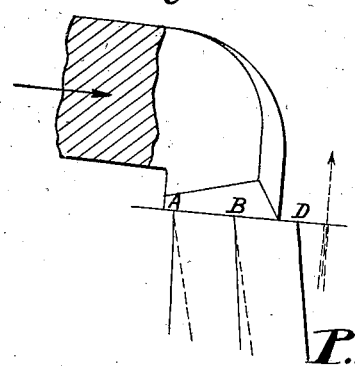

Lastly, Fig. 12 shows a finished screw-thread backed off behind its cutting edges A B.

The broken line A $a\ a^1\ a^2$ A $a\ a^1\ a^2$ represents the path of the tool used for effecting the backing off. The part $a^1\ a^2$ of the said path corresponds to the recoil motion of amplitude equal to $\frac{p^1 x}{4}$ which has been previously referred to.

It has been stated above that a tool, which works in the manner diagrammatically illustrated in Fig. 2, as is the case with the tools forming the subject of the present invention, possesses a natural cut along its active edge A B, on account of the inclination of the helix forming its path. When cutting the usual screw threads the said inclination is small, and therefore, the cutting action of the tool is not much improved thereby.

Figure 13:
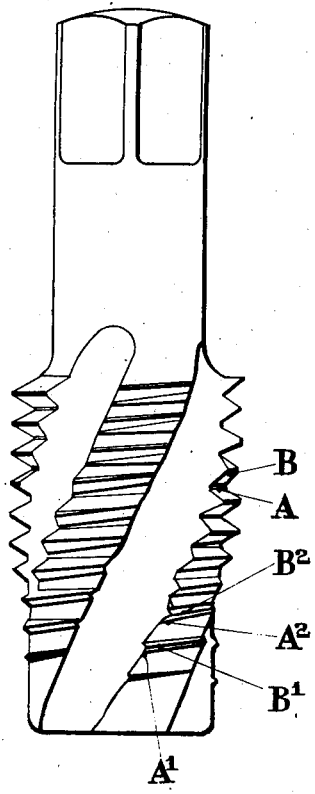

It may be advantageous in certain cases to increase the front clearance angle of the said tool, and this may be effected, for example, in the case of a tap such as is indicated in Fig. 4 by substituting for the ordinary milled grooves which are straight and parallel to the axis of the tap, helicoidal grooves the pitch of which has the same direction as that of the screw-thread, but is much greater than the latter as shown in Fig. 13.

The method of manufacture will under these conditions be altered as follows:—

The operations which are illustrated in Figs. 5 and 6 and described above being finished, the grooves are milled along a path of large pitch (to the right for a right-hand screw-thread and to the left for a left-hand screw-thread). In order that the edges $A^1\ B^1$, $A^2\ B^2$, A B, shall in all cases be rectilinear, it is necessary and sufficient that the cutting surfaces thus milled should coincide with the surface of a screw having a triangular thread of the same angle as that of the screw-thread but with a greater pitch P, or in other words, that the milled cutting surface must be an oblique helicoid, the generating line of which makes with the axis, the same angle as the generating line of the helicoid forming the active cutting side of the actual screw-thread of the tap.

For the most usual case when the section of the screw-thread is an equilateral triangle, the milling cutter will have a shape which approximates to that of the milling cutters used for cutting twist-drills or so-called American drills. Tools of this kind have in fact been made for cutting helicoidal grooves of predetermined form.

The said milling work being finished, it remains to effect the backing off; which operation is effected as above described, except that the amplitude of the recoil movement which previously was $$\frac{p^1 x}{4}$$

for a tap with four cuts becomes now $$\frac{p^1 x}{4}\left(1+\frac{p^1}{P-p^1}\right)$$

This may be proved by means of simple geometrical considerations by drawing the development on a plane of the directing helices of the helicoids having pitches $p^1$, $p^1.(1+x)$ and P respectively.

This result is extremely important for the reason that when backing off is effected by means of a radial as distinct from a helicoidal action, the manufacture of taps in which helicoidal grooves form the front cutting surfaces presents considerable difficulties.

As stated above, the present backing off methods apply equally to taps having straight or helicoidal grooves. The above description refers particularly to taps, but it may be applied in great part to dies, the difference being that the latter have internal instead of external cutting surfaces.

What I claim is:—

1. An improved screw cutting tool of the type of taps, dies and the like comprising a series of teeth, in which similar sides, one on each tooth, are formed as cutting (front) edges and all lie on a first common screw surface, while the opposite set of similar sides, one on each tooth, is formed with non-cutting (back) edges, and all lie on a second common screw surface, the non-cutting edges being such that each surface formed by the back of a tooth and passing through one of the said edges coincides with the said second common screw surface; while the cutting edges are such that the surfaces formed by the backs of the teeth and passing through the said edges are screw surfaces having a common pitch which is greater than that of either of the said common screw surface, the screw surfaces for consecutive teeth being axially displaced with regard to one another.

2. A screw cutting tool of the type of taps and dies and the like as claimed in claim 1 in which instead of the front cutting surfaces of the teeth being parallel to the axis of the screw cutting tool, the said front cutting surfaces are in contradistinction helical surfaces so as to increase the front clearance angle of the cutting edges of the teeth.

In testimony whereof I have signed my name to this specification.

PAUL KREUTZBERGER.